UNITED STATES PATENT OFFICE.

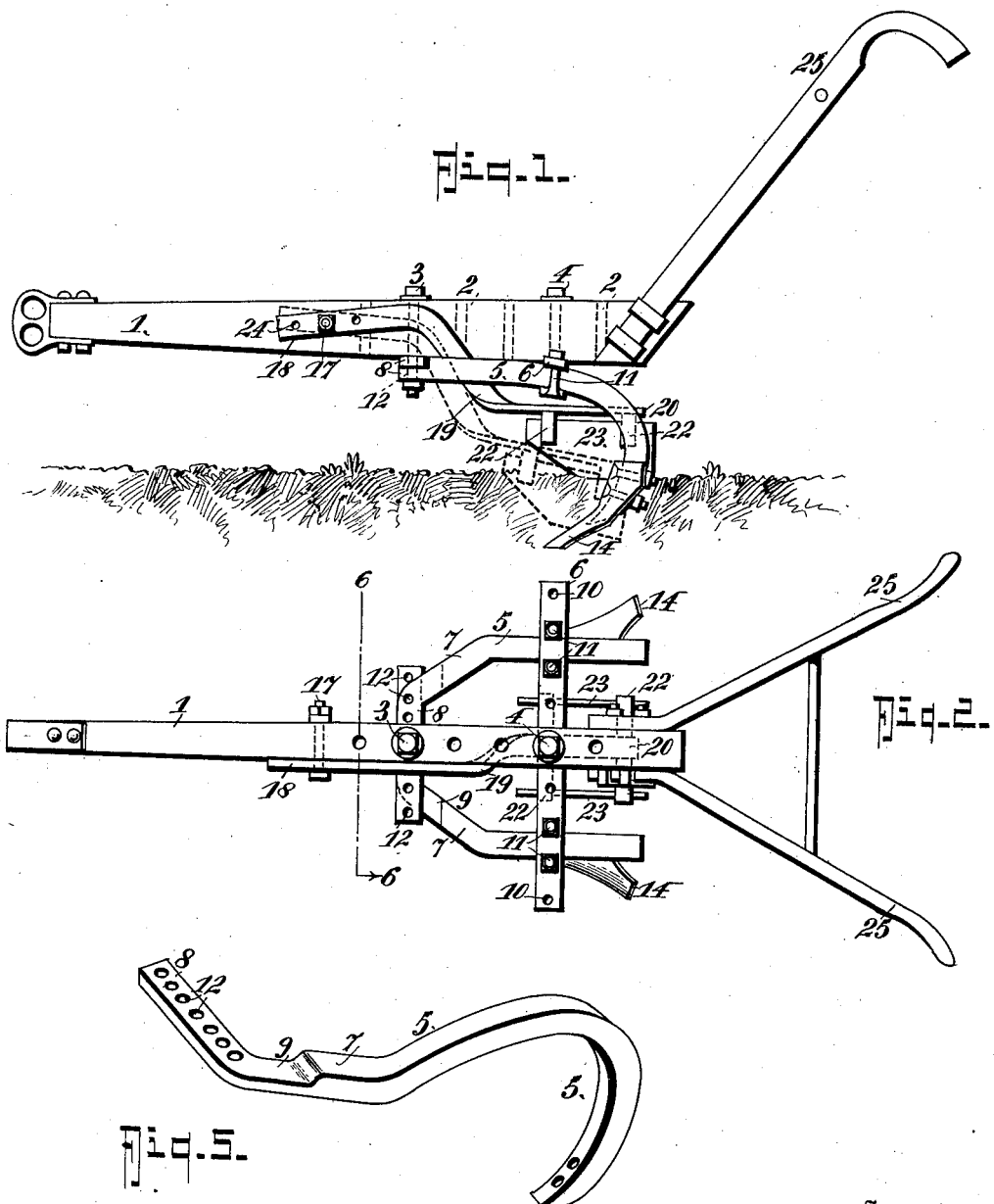

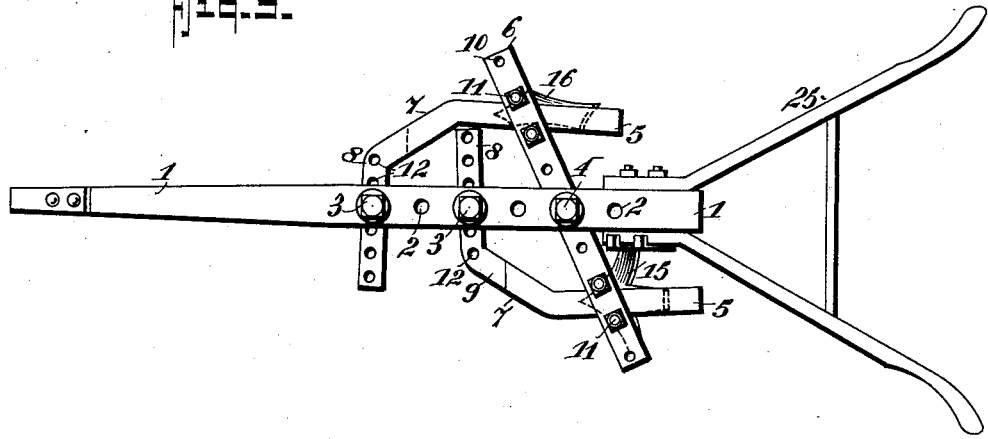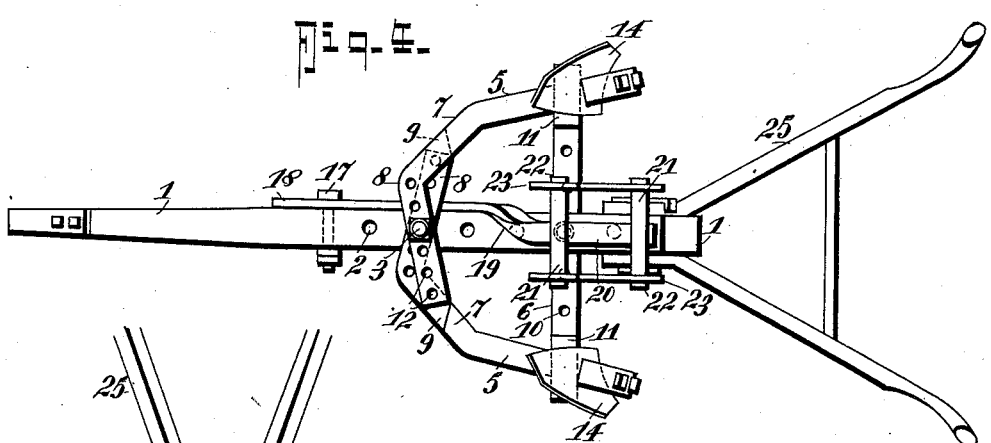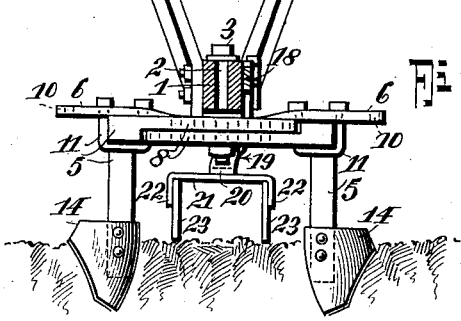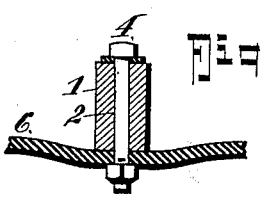

JESSE C. TURNIPSEED, OF GRIFFIN, GEORGIA.

CULTIVATOR.

1,095,047.          Specification of Letters Patent.          Patented Apr. 28, 1914.

Application filed July 2, 1912. Serial No. 707,265.

*To all whom it may concern:*

Be it known that I, JESSE C. TURNIPSEED, a citizen of the United States, residing at Griffin, in the county of Spalding and State of Georgia, have invented new and useful Improvements in Cultivators, of which the following is a specification.

This invention relates to cultivators adapted to be used for cultivating corn and other crops, for barring off cotton, for covering corn or other grain, or as a harrow for breaking the crust around nearly all kinds of truck, and it has for its principal object to produce a cultivator of simple and improved construction comprising a main beam and shovel beams adjustably connected therewith in such a manner as to be capable of being adjusted to various positions according to the particular use to which the implement is to be applied.

A further object of the invention is to simplify and improve the construction of the shovel beams and the means whereby the latter are mounted and adjusted with reference to the main beam.

A further object of the invention is to produce a simple and improved gravity fender for use in connection with the device.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation of the improved cultivator with the fender attached, dotted lines being used to indicate a different position of the fender. Fig. 2 is a top plan view showing the cultivator arranged substantially as shown in Fig. 1 for straddling a row and the right and left turning plows applied to the standards. Fig. 3 is a top plan view showing a different arrangement of the shovel beams whereby one of said beams is arranged in advance of the other beam, the standards of said beams being equipped, respectively, with a scooter and with a sweep. Fig. 4 is a bottom plan view showing the shovel beams disposed slantingly and diverging rearwardly so as to present a pigeon-toed arrangement of the shovels. Fig. 5 is a perspective detail view of the shovel beams. Fig. 6 is a sectional view taken on the line 6—6 in Fig. 2 through the main beam in front of the shovel beams and looking in a rearward direction. Fig. 7 is a transverse sectional view taken on the line 7—7 in Fig. 2.

Corresponding parts in the several figures are denoted by like characters of reference.

The main beam 1 is provided with a plurality of vertical apertures 2, 2 for the passage of bolts 3 and 4, the former of which serves for the attachment of the shovel beams 5, while the latter bolt 4 serves for the attachment of a cross bar 6 which is utilized for spacing and securing the rear ends of the shovel beams, as will be presently more fully described.

The shovel beams 5 are made preferably of metal, and each of said beams is provided near its front end with an oblique offset 7 extending in the direction of the main beam 1. Each of the oblique offsets 7 has a terminal laterally extending arm 8 that extends beneath the main beam, transversely thereof. The oblique offsets 7 of the shovel beams are shouldered, as shown at 9, adjacent to the lateral arms, said arms 8, 8 of the two beams being arranged to overlap, and said arms being of a combined thickness approximately equal to the thickness of the main portion of each shovel beam. The shovel beams 5, 5 will thus be maintained in substantially the same horizontal plane when associated with the beam in any of the various positions to which said shovel beams may be adjusted.

The cross bar 6 which, as previously stated, serves to space and connect the shovel beams 5, is provided with apertures 10 for the passage of clips 11, whereby said shovel beams are adjustably connected with the cross bar. The overlapping central arms 8 at the front ends of the shovel beams are provided each with a series of apertures 12 for the passage of the attaching bolt 3, said apertures being spaced to correspond with the spacing of the apertures 10, thus enabling the shovel beams to be laterally adjusted and still remain in parallel relation to one another. The shovel beams 5 are provided at their rear ends with downturned curved standards 13 upon which the sweeps, shovels or plows of various constructions may be mounted, such as, for instance, shovel plows 14 of the ordinary right and left turning type, sweeps 15, scooters 16, or other types of earth engaging implements that it may be desired to use in connection with the device.

The main beam 1 is provided with a bolt 17 extending transversely therethrough, and on one end of said bolt, adjacent to one side of the beam is mounted a draft bar 18 having a downwardly offset and laterally extending portion 19 terminating beneath the longitudinal medial line of the main beam 1 beneath which an arm 20 constituting an extension of the draft beam 18 extends rearwardly. The arm 20 is provided with cross bars 21 having downwardly extending limbs 22 upon which fenders 23 are mounted. It will be observed that the draft bar 18 is mounted pivotally on the bolt 17, and the fenders will thus drop by gravity until they rest upon the ground, the downward movement being limited by the uppermost overlapping arm 8 of one of the shovel beams. The draft bar 18 is provided with a plurality of perforations 24, any one of which may be engaged by the bolt 17, thus permitting the fender carrying draft bar to be moved forwardly or rearwardly, as may be required. When the fender carrying bar is moved forwardly, the inclined offset portion 19 of said bar will engage the arm 8, and the downward movement of the fenders will thus be limited. It will thus be seen that the fenders may be adjusted according to the depth at which the earth engaging implements are desired to work in the ground, and also that the said fenders will rest on the surface of the ground by gravity and will, therefore, easily ride over any obstructions that may be encountered.

The beam 1 is provided at the rear end thereof with suitable handles 25 whereby the device may be guided when in operation.

From the foregoing description and by reference to the drawings hereto annexed, it will be readily seen that the shovel beams may be adjusted in various ways according to the use to which the device is to be applied. Thus, the shovel beams may be arranged in parallel relation and in alinement with each other, as shown in Figs. 1 and 2. The beams may be arranged one in advance of the other, as shown in Fig. 3, and in any of the various arrangements of the beams they may be spaced or adjusted laterally to various distances with relation to each other and to the plow beam.

Various earth engaging implements or blades may also be used in connection with the device which may be successfully and efficiently employed for any of the various purposes set forth. The offsets 7 of the beams 5 being shouldered on their opposed faces will permit the arms 8 to not merely overlap, but to extend beyond the offset portions of the opposed beams, as clearly seen in Fig. 2, thereby considerably increasing the range of lateral adjustment of the beams. The fender, when used, serves to protect the tender plants thrown in the direction thereof, and the said fender is adjustable longitudinally and capable of having its vertical movement in a downward direction restricted by engagement with the overlapping front portions of the shovel beams.

Having thus described the invention, what is claimed as new, is:—

In a cultivator, a main beam, shovel beams having overlapping arms connected with the underside of the main beam, a draft bar connected pivotally with the main beam adjacent to one side face thereof and longitudinally adjustable with reference thereto, said draft bar having a downwardly and laterally offset portion, said offset portion engaging the overlapping arms of the shovel beams, whereby the downward movement of the bar is limited.

In testimony whereof I affix my signature in presence of two witnesses.

JESSE C. TURNIPSEED.

Witnesses:
E. E. WOLCOTT,
R. Z. ISAN.

---

Copies of this patent may be obtained for five cents each, by addressing the "Commissioner of Patents, Washington, D. C."